(12) United States Patent
Iizuka

(10) Patent No.: US 6,288,831 B1
(45) Date of Patent: Sep. 11, 2001

(54) LASER MODULATING OPTICAL SYSTEM

(75) Inventor: Takashi Iizuka, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/602,021

(22) Filed: Jun. 23, 2000

(30) Foreign Application Priority Data

Jun. 25, 1999 (JP) .................................................. 11-180341

(51) Int. Cl.$^7$ ....................................................... G02F 1/33
(52) U.S. Cl. ............................................. 359/308; 359/305
(58) Field of Search .................................. 359/306, 305, 359/308, 312

(56) References Cited

U.S. PATENT DOCUMENTS

| | | |
|---|---|---|
| 4,971,413 | 11/1990 | Inoue . |
| 5,128,798 * | 7/1992 | Bowen et al. ................. 359/260 |
| 5,852,293 | 12/1998 | Iwasaki et al. . |

FOREIGN PATENT DOCUMENTS 61193130    8/1986    (JP) .

* cited by examiner

*Primary Examiner*—Hung Xuan Dang
(74) *Attorney, Agent, or Firm*—Greenblum & Bernstein, P.L.C.

(57) ABSTRACT

Disclosed is a laser modulating optical system, which includes an argon laser that emits at a plurality of peak wavelengths, an acoustooptic modulator (AOM) that changes a direction of an emergent light by diffraction caused by input ultrasonic wave to take out a diffracted beam as a modulated beam, and a correction optical system. The correction optical system includes one pair of wedge prisms located in a parallel laser beam at the incident side of the AOM. The wedge prisms are arranged with a predetermined space therebetween. The apex of one prism is opposite in direction to the apex of the other prism to have the opposite chromatic dispersions to each other. The wedge prisms are designed to coincide the optical paths of two peak wavelengths that are deviated to each other due to a variation of the diffraction angle of the AOM.

7 Claims, 3 Drawing Sheets

LASER MODULATING OPTICAL SYSTEM

BACKGROUND OF THE INVENTION

Figure 1:
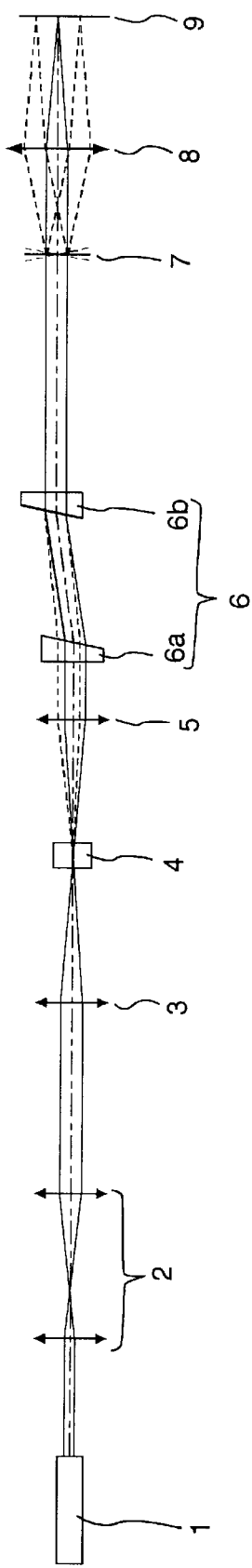

The present invention relates to a laser modulating optical system, which is used in a laser photo plotter or the like, including a multiple line laser source and an acoustooptic modulator (AOM).

The laser photo plotter is provided with a light source that emits a laser beam, a polygon mirror that deflects the modulated laser beam and an fθ lens that focuses the deflected laser beam to form a beam spot on an object surface to be exposed, for example. The beam spot scans as the polygon mirror rotates, which forms scanning lines on the object surface.

An optical device such as the laser photo plotter that requires relatively large light quantity employs a gas laser as the light source. In general, a gas laser emits at a plurality of peak wavelengths. For example, an argon laser emits at a plurality of peak wavelengths in the ultraviolet region and the visible region.

On the other hand, the gas laser cannot directly switch (ON/OFF) an emission of the laser beam, which requires a modulator located in the optical path between the light source and the polygon mirror. The AOM, which changes a direction of an emergent laser beam by diffraction caused by input ultrasonic wave, is frequently used as the modulator of the laser photo plotter. In the AOM, when the ultrasonic wave is applied to a medium, a diffraction grating is formed by compression wave caused in the medium. The diffracted light is used as the modulated drawing beam and the non-diffracted light is cut off.

However, since the diffraction angle of the emergent laser beam modulated by the AOM varies in proportion to the wavelength of the incident light, the emergent angles vary depending on the wavelength, which deviates the optical paths of the respective wavelengths. As a result, if the AOM is not conjugate to the object surface, the laser beam that should form a single beam spot forms a plurality of beam spots at the different points on the object surface. If the AOM is conjugate to the object surface, the position variation of the beam spots can be prevented. However, since the incident angle to the object surface varies corresponding to the wavelength, when field curvature of the fθ lens or mechanical error causes a partial out-focus area, a plurality of beam spots are formed at the different points in the out-focus area.

Since the spot separation seriously deteriorate the drawing performance of the plotter, the conventional optical system includes a filter that selects one peak wavelength. The filter cuts the peak wavelengths other than the selected peak wavelength, which lowers the energy efficiency.

Japanese Patent Provisional Publication No. Sho 61-193130 discloses the optical system including a wedge prism located at the front and/or rear of the AOM. Since the chromatic dispersion of the AOM can be canceled by the chromatic dispersion of the wedge prism, the optical paths of the laser beams of different wavelengths coincide with each other.

However, in the optical system of the publication, since the wedge prism is disposed in the divergent or convergent laser beam, astigmatism and coma occur.

Further, since the correction effect is fixed by the specification of the wedge prism, the chromatic dispersion of the wedge prism should be accurately defined to coincide the optical paths, which narrows tolerance to the specification of the wedge prism, increasing manufacturing time.

SUMMARY OF THE INVENTION

It is therefore an object of the present invention to provide a laser modulating optical system including the multiple line laser source and the AOM, which is capable of correcting the effect of the wavelength dependence of the AOM. Further, the present invention aims to prevent the generations of astigmatism and coma, and to increase the tolerance to the specification of the element in a correction optical system.

For the above object, according to the present invention, there is provided an improved laser modulating optical system, which includes a multiple line laser source that emits at a plurality of peak wavelengths, an acoustooptic modulator (AOM) that changes a direction of an emergent beam by diffraction caused by input ultrasonic wave to take out a diffracted beam as a modulated beam, and a correction optical system for correcting deviation between optical paths of at least two peak wavelengths due to a variation of the diffraction angle of the AOM.

The correction optical system includes at least one pair of chromatic dispersing elements located at the position where the laser beam becomes substantially parallel and in at least one of the incident and exit sides of the AOM. Namely, when the correction optical system includes one pair of the chromatic dispersing elements, a pair of the elements are located at the incident side together or at the exit side together. When the correction optical system includes two pairs of the chromatic dispersing elements, one pair is located at the incident side and the other pair is located at the exit side. Each of the chromatic dispersing elements has a predetermined chromatic dispersion and has no lens power. The lens power is a refractive power to diverge or converge a light beam. That is, the chromatic dispersing element does not change divergence or convergence of the light beam, while it only changes a direction of the light beam.

With this construction, since the correction optical system corrects the deviation between optical paths of different peak wavelengths due to a variation of the diffraction angle of the AOM, the optical paths coincide with each other. Accordingly, when the laser modulating optical system is applied to a laser photo plotter, the light beams of a plurality of peak wavelengths can be used for the drawing, which increases energy efficiency.

The chromatic dispersing element may be a wedge prism or a diffraction grating. In each case, a pair of the chromatic dispersing elements are arranged such that the chromatic dispersion of the one element is opposite in direction to the chromatic dispersion of the other element.

Further, the pair of chromatic dispersing elements may consists of a pair of wedge prisms, a pair of diffraction gratings or a combination of the prism and the grating. The space between the chromatic dispersing elements of each pair may vary to adjust the correction effect of the correction optical system.

DESCRIPTION OF THE ACCOMPANYING DRAWINGS

Figure 2:
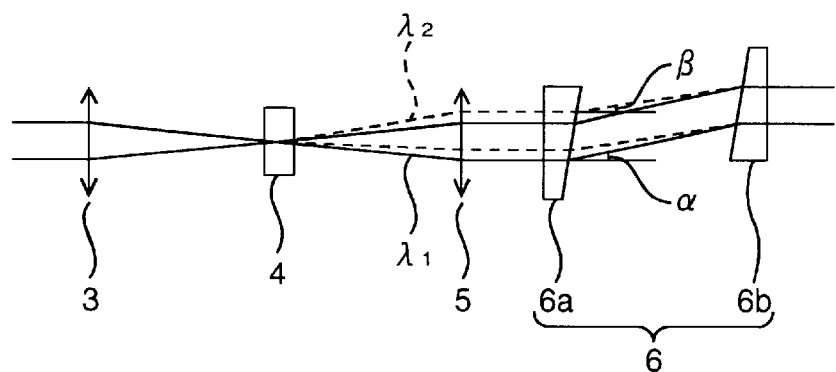
Figure 3A:
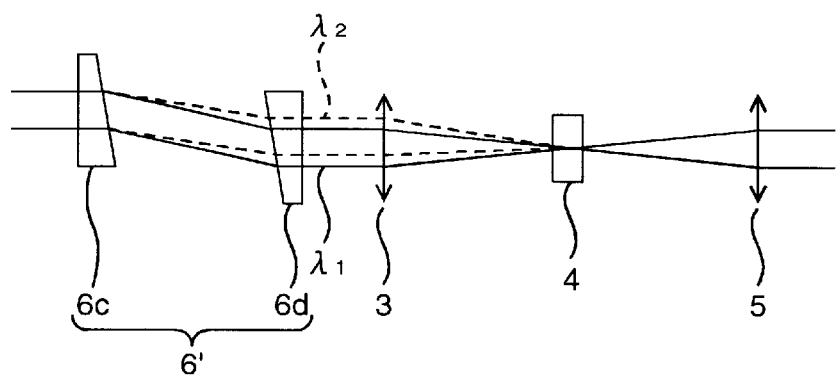
Figure 3B:
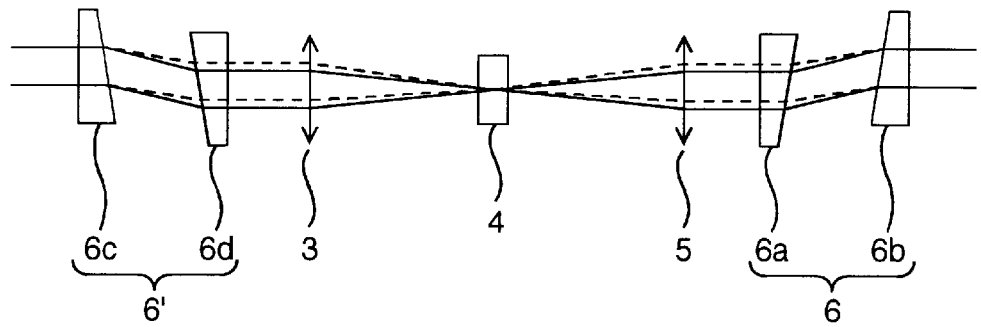
Figure 4A:
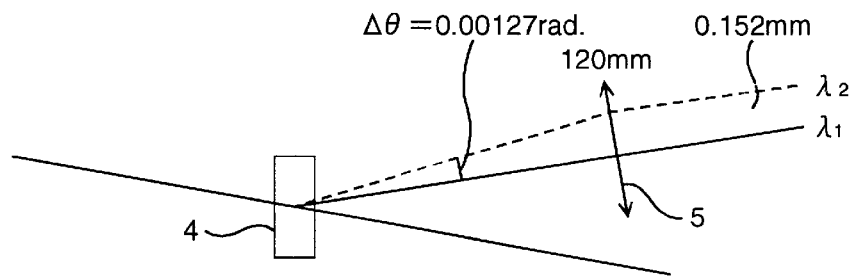
Figure 4B:
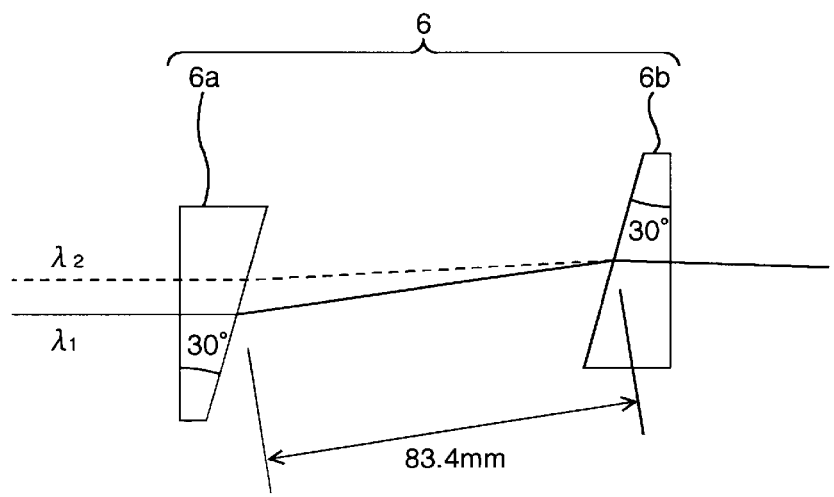
Figure 4C:
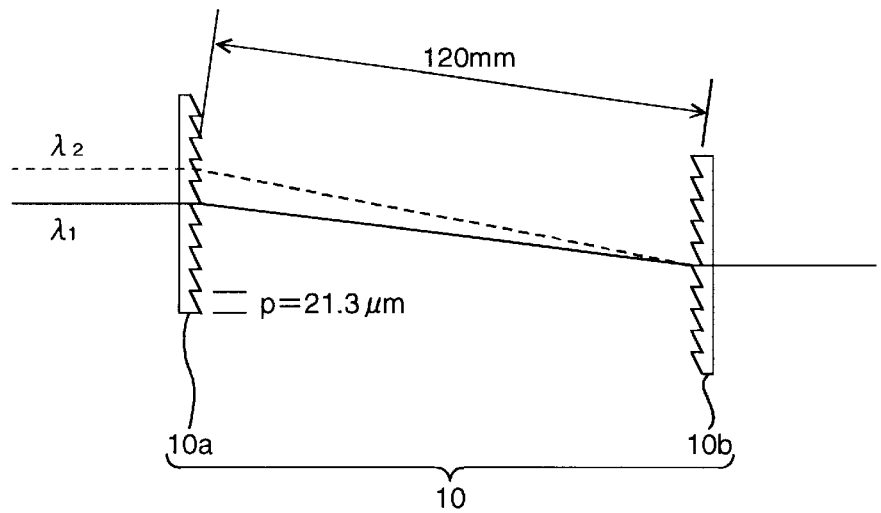

FIG. 1 shows the entire construction of a scanning optical system to which the laser modulating optical system of a first embodiment is applied, FIG. 2 is a partial enlarged view of FIG. 1 to show a correction optical system, FIG. 3A shows the arrangement of the correction optical system according to a second embodiment, FIG. 3B shows the arrangement of the correction optical system according to a third embodiment, and FIGS. 4A, 4B and 4C are schematic views of the correction optical systems of the embodiments.

DESCRIPTION OF THE EMBODIMENTS

Embodiments of the present invention will be described with reference to the drawings. FIG. 1 shows a scanning optical system to which the laser modulating optical system of the first embodiment is applied. FIG. 2 is an enlarged view of a correction optical system of FIG. 1. First, the entire construction of the scanning optical system will be described with reference to FIG. 1, and then, the principle of the correction optical system will be explained with reference to FIG. 2.

The scanning optical system of the first embodiment includes, as shown in FIG. 1, a laser source 1, a beam expander 2, a converging lens 3, an acoustooptic modulator (AOM) 4, a collimator lens 5, a correction optical system 6, a polygon mirror 7 as a scanning deflector, and an fθ lens 8 as a scanning lens, arranged in that order form the left hand in FIG. 1. A reference 9 denotes an object surface to be exposed such as a photoconductive surface.

The laser source 1 is a gas laser such as an argon laser that emits at a plurality of peak wavelengths. The laser beam emitted from the laser source 1 is enlarged in its diameter by the beam expander 2 and converged by the converging lens 3. The convergent laser beam is modulated by the AOM 4 that is substantially positioned at a focal point of the converging lens 3. The AOM 4 changes a direction of an emergent laser beam by ON/OFF switching of input ultrasonic wave. In the AOM 4, when the ultrasonic wave is applied to a medium, a diffraction grating is formed by compression wave caused in the medium. The diffracted light is taken out as the modulated drawing beam and the non-diffracted light is cut off by a shading plate.

The modulated laser beam is collimated by the collimator lens 5 to be incident on the correction optical system 6. The correction optical system 6 includes a pair of chromatic dispersing elements, each of which has a predetermined chromatic dispersion and no lens power. In the first embodiment, the correction optical system 6 includes first and second wedge prisms 6a and 6b. The wedge prisms 6a and 6b are arranged with a predetermined space therebetween. The apex of the first prism 6a is opposite in direction to the apex of the second prism 6b to have the opposite chromatic dispersions to each other. The first and second prisms 6a and 6b are designed to coincide the optical paths of two laser beams of different peak wavelengths λ1 and λ2 that are deviated to each other due to a variation of the diffraction angle of the AOM 4. The concrete design of the correction optical system 6 will be described later.

The laser beam passed through the correction optical system 6 is incident on the polygon mirror 7 and is deflected and scanned as the polygon mirror 7 rotates. The deflected laser beam is converged by the fθ lens 8 to form a beam spot on the object surface 9 scanning along a main scanning direction.

Next, the details of the correction optical system 6 will be described with reference to FIG. 2. The first wedge prism 6a is arranged such that the apex thereof is directed in the downward direction in FIG. 2, and the second wedge prism 6b is arranged such that the apex thereof is directed in the upward direction in FIG. 2. The first and second prisms 6a and 6b are formed from the same glass material and have the same shape. That is, the prisms 6a and 6b have the same chromatic dispersion.

The laser beam converged by the converging lens 3 and diffracted by the AOM 4 separates due to the wavelength dependence of the AOM 4. That is, laser components of different wavelengths are diffracted in the different angles by the AOM 4. The laser component of wavelength λ1 progresses along a solid line and the laser component of wavelength λ2 progresses along a dotted line. Since the laser components are collimated by the collimator lens 5, the optical path of the laser component λ1 is deviated from the optical path of the laser component λ2 in parallel at the exit side of the collimator lens 5.

It should be noted that only the difference of the diffraction angle due to the wavelength dependence of the AOM 4 is shown in FIGS. 1 and 2 to ease the description. Therefore, the emergent optical path of the laser component λ1 from the AOM 4 is illustrated to be in line with the incident laser beam thereon. In practice, since the diffracted beam is used as a drawing beam, the emergent optical path of each laser component from the AOM 4 would form a predetermined angle with respect to the incident laser beam on the AOM 4.

The correction optical system 6 corrects the parallel deviation between the optical paths of the laser components λ1 and λ2 to coincide them to each other. Namely, while the two laser components are refracted in the upward direction by the first wedge prism 6a, the refraction angles thereof are different to each other. In this example of FIG. 2, the refraction angle α of the laser component λ1 is larger than the refraction angle β of the laser component λ2. In such a setting, the deviation between the optical paths of the laser components λ1 and λ2 first decreases with distance from the first wedge prism 6a, and at the predetermined cross point, the optical paths coincide with each other. Then, the deviation increases with distance from the cross point. The second wedge prism 6b is located at the cross point.

The second wedge prism 6b further refracts the laser components of different wavelengths. Since the apex of the second wedge prism 6b is opposite in direction to the apex of the first wedge prism 6a, the refraction angle of the laser component λ1 is −α and the refraction angle of the laser component λ2 is −β, the emergent direction from the second wedge prism 6b of the laser components becomes in parallel to the incident directions on the first prism 6a. Therefore, the parallel deviation between the optical paths of the laser components λ1 and λ2 at the incident side of the first wedge prism 6a is canceled at the incident point of the second wedge prism 6b. Further, the angular difference between the optical paths of the laser components λ1 and λ2 at the exit side of the first wedge prism 6a is canceled through the second wedge prism 6b. As a result, the optical paths of the laser components λ1 and λ2 coincide with each other, the laser beam is incident on the polygon mirror 7 as an integrated single laser beam.

Since the correction optical system 6 is located in the parallel laser beam, coma and astigmatism do not occur. Further, since a pair of the wedge prisms 6a and 6b shift the optical paths in parallel to correct the deviation between the laser components of different wavelengths, the correction effect, which is a difference between the shift amounts, can be easily adjusted by changing the space between the prisms, which allows larger tolerance to the chromatic dispersion as compared with the conventional correction optical system that consists of a single prism. That is, in the conventional correction optical system, since the correction effect is fixed by the apex angle and optical characteristics of the prism material, the prism should be accurately manufactured. On the other hand, in the embodiment, since the correction effect is adjustable by changing the space between the prisms, each of the prisms may be not-so-accurate element.

The specification of the correction optical system 6, which includes chromatic dispersion of the prism material, the apex angle and the space between the prisms, is determined according to the peak wavelengths of the laser source 1 to obtain the appropriate correction effect. Particularly, when the space between the prisms is variable, the correction effect can be easily adjusted even if the prisms have errors in the chromatic dispersion.

The location of the correction optical system is not limited to the exit side of the AOM 4. FIGS. 3A and 3B shows arrangements of the correction optical system according to the second and third embodiments.

In the second embodiment, as shown in FIG. 3A, a correction optical system 6', which includes a pair of wedge prisms 6c and 6d, is located at the incident side of the AOM 4.

In the third embodiment, as shown in FIG. 3B, a correction optical system 6', which includes a pair of prisms 6c and 6d, is located at the incident side of the AOM 4 in addition to a correction optical system 6, which includes a pair of prisms 6a and 6b arranged at the exit side of the AOM 4.

Further, the chromatic dispersing element may be a diffraction grating instead of the prism. In such a case, a pair of diffraction gratings are arranged such that the chromatic dispersion of one diffraction grating is opposite in direction to the chromatic dispersion of the other diffraction grating.

Next, the concrete numerical example of the correction optical system will be described.

The diffraction angle $\theta$ (rad.) of the AOM 4 is obtained by ultrasonic frequency f (Hz), propagation velocity v (m/s) of the ultrasonic wave in the medium and wavelength $\lambda$ (nm) of the incident laser beam, based upon the following equation.

$$\theta = \lambda \cdot f / v$$

The angular difference $\Delta\theta$ between the diffraction angles of the laser components of the peak wavelengths $\lambda 1$ and $\lambda 2$ is expressed as follows.

$$\Delta\theta = (\lambda 2 - \lambda 1) \cdot f / v$$
$$= \Delta\lambda \cdot f / v$$

In this example, the laser source 1 is an argon laser, and the first peak wavelength $\lambda 1 = 488$ nm and the second peak wavelength $\lambda 2 = 515$ nm are selected among peak wavelengths of the argon laser. Further, the medium of the AOM 4 is TeO$_2$ (v=4260 m/s) and the frequency of the ultrasonic wave applied as the propagation wave is 200 MHz. Under such a condition, the angular difference $\Delta\theta$ in the first order diffraction beams is as follows.

$$\Delta\theta = 0.00127 \text{ rad.}$$

When these laser components are collimated by the collimator lens 5 whose focal length is 120 mm, the parallel deviation between the optical paths becomes 0.152 mm as shown in FIG. 4A. In order to correct the deviation, as shown in FIG. 4B, the prisms 6a and 6b are arranged such that the chromatic dispersions are opposite in direction to each other.

Each of the wedge prisms 6a and 6b is formed of BK7 whose refractive index at d-line (588 nm) is 1.51633 and Abbe number is 64.1. The apex angle of each prism is 30 degrees. The first and second wedge prisms 6a and 6b are arranged at space of 83.4 mm therebetween.

Under this condition, the difference between the parallel shifts of the laser components $\lambda 1$ and $\lambda 2$ caused by the wedge prisms 6a and 6b becomes 0.152 mm, which cancels the deviation of the optical paths of the laser components $\lambda 1$ and $\lambda 2$ due to the wavelength dependence of the AOM 4. As a result, the optical paths of the laser components $\lambda 1$ and $\lambda 2$ coincide with each other.

FIG. 4C shows a correction optical system 10 that consists of a pair of diffraction gratings 10a and 10b as the chromatic dispersing elements. The grating pitch of each of the diffraction gratings 10a and 10b is 21.3 $\mu$m. The diffraction gratings 10a and 10b are arranged such that the chromatic dispersion of the one grating 10a is opposite in direction to the chromatic dispersion of the other grating 10b at space of 120 mm therebetween. Under this condition, the difference between the parallel shifts of the laser components $\lambda 1$ and $\lambda 2$ caused by the diffraction gratings 10a and 10b becomes 0.152 mm.

When the diffraction grating is used as the chromatic dispersing element, since the parallel shift amount is in proportion to the wavelength, the correction optical system coincides the optical paths of not only the wavelengths $\lambda 1$ and $\lambda 2$ but also other wavelengths.

On the other hand, when the wedge prism is used as the chromatic dispersing element, since the relationship between the parallel shift amount and the wavelength is not expressed by a linear function, the correction optical system only coincides the optical paths of the wavelengths $\lambda 1$ and $\lambda 2$ with each other in the strict sense. However, it can be considered that the optical paths of the wavelengths other than $\lambda 1$ and $\lambda 2$ are also coincident with each other in fact.

As described above, the correction optical system is capable of correcting the deviation between the optical paths of different peak wavelengths, which coincides the position of the beam spots formed by a plurality of peak wavelengths, increasing energy efficiency.

Further, since the correction optical system is located at the position where the laser beam becomes parallel, coma and astigmatism do not occur, which keeps optical performance of the entire optical system to which the modulating optical system is applied.

Still further, since a pair of the chromatic dispersing elements shift the optical paths in parallel to correct the deviation between the laser components of different wavelengths, the correction effect can be easily adjusted by changing the space between the chromatic dispersing element, which allows larger tolerance to the chromatic dispersion with easy manufacturing.

The present disclosure relates to the subject matter contained in Japanese Patent Application No. HEI 11-180341, filed on Jun. 25, 1999, which is expressly incorporated herein by reference in its entirety.

What is claimed is:

1. A laser modulating optical system, comprising:

a multiple line laser source that emits at a plurality of peak wavelengths;

an acoustooptic modulator that changes a direction of an emergent beam by diffraction caused by input ultrasonic wave, said acoustooptic modulator taking out a diffracted beam as a modulated beam; and a correction optical system for correcting deviation between optical paths of at least two laser components of different peak wavelength due to a variation of the diffraction angle of said acoustooptic modulator, said correction optical system comprising at least one pair of chromatic dispersing elements located at a position where the laser beam becomes parallel and in at least one of incident and exit sides of said acoustooptic modulator;

wherein each of said chromatic dispersing elements has a predetermined chromatic dispersion and has no lens power.

2. The laser modulating optical system according to claim 1, wherein said pair of chromatic dispersing element comprises a pair of wedge prisms, and wherein said pair of wedge prisms are arranged such that the chromatic dispersion of the one wedge prism is opposite in direction to the chromatic dispersion of the other wedge prism.

3. The laser modulating optical system according to claim 2, respective faces of each of said pair of wedge prisms being parallel.

4. The laser modulating optical system according to claim 1, wherein said pair of chromatic dispersing element comprises a pair of diffraction gratings, and wherein said pair of diffraction gratings are arranged such that the chromatic dispersion of the one diffraction grating is opposite in direction to the chromatic dispersion of the other diffraction grating.

5. The laser modulating optical system according to claim 1, wherein said correction optical system consists of a pair of said chromatic dispersing elements located at the incident side of said acoustooptic modulator.

6. The laser modulating optical system according to claim 1, wherein said correction optical system consists of a pair of said chromatic dispersing elements located at the exit side of said acoustooptic modulator.

7. The laser modulating optical system according to claim 1, wherein said correction optical system includes a pair of said chromatic dispersing elements located at the incident side of said acoustooptic modulator and a pair of said chromatic dispersing elements located at the exit side of said acoustooptic modulator.

* * * * *